United States Patent
Liu

(10) Patent No.: US 9,001,648 B2
(45) Date of Patent: Apr. 7, 2015

(54) APPARATUS AND METHOD FOR SPARE CAPACITY ALLOCATION ON DUAL LINK FAILURES

(75) Inventor: Victor Yu Liu, Emeryville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 485 days.

(21) Appl. No.: 13/434,632

(22) Filed: Mar. 29, 2012

(65) Prior Publication Data

US 2012/0250500 A1    Oct. 4, 2012

Related U.S. Application Data

(60) Provisional application No. 61/468,682, filed on Mar. 29, 2011.

(51) Int. Cl.
*H04L 12/703* (2013.01)
*H04L 12/707* (2013.01)
*H04L 12/911* (2013.01)

(52) U.S. Cl.
CPC ............... *H04L 45/28* (2013.01); *H04L 45/22* (2013.01); *H04L 47/728* (2013.01)

(58) Field of Classification Search
None
See application file for complete search history.

(56) References Cited

U.S. PATENT DOCUMENTS

| | | | | |
|---|---|---|---|---|
| 5,680,326 | A * | 10/1997 | Russ et al. | 714/4.21 |
| 5,850,505 | A | 12/1998 | Grover et al. | |
| 6,421,349 | B1 * | 7/2002 | Grover | 370/408 |
| 6,744,727 | B2 * | 6/2004 | Liu et al. | 370/228 |
| 8,036,114 | B2 * | 10/2011 | Magill et al. | 370/230 |
| 8,817,604 | B2 * | 8/2014 | Mang et al. | 370/228 |
| 2009/0097418 | A1 * | 4/2009 | Castillo et al. | 370/255 |

FOREIGN PATENT DOCUMENTS

WO        0215498 A2    2/2002

OTHER PUBLICATIONS

Foreign Communication From a Related Counterpart Application, PCT/US2012/031252, International Search Report dated Jun. 6, 2012, 5 pages.
Foreign Communication From a Related Counterpart Application, PCT/US2012/031252, Written Opinion dated Jun. 6, 2012, 10 pages.
Chandak, A. et al., "Dual-Link Failure Resiliency Through Backup Link Mutual Exclusion," Broadband Networks, 2nd International Conference on Boston, Massachusetts, Oct. 3-7, 2005, pp. 276-285.

(Continued)

*Primary Examiner* — Hicham Foud
(74) *Attorney, Agent, or Firm* — Conley Rose, P.C.; Grant Rodolph; Brandt D. Howell

(57) ABSTRACT

A method implemented by an apparatus for providing spare capacity allocation (SCA) for dual link failures in a network. The SCA scheme computes the SCA for each of a plurality of flows in the network for a plurality of primary backup paths corresponding to a plurality of disjoint working paths for the flows using a first integer linear programming (ILP) model. The SCA scheme further computes the SCA for each of the flows for a plurality of secondary backup paths corresponding to the disjoint working paths and the primary backup paths using a second ILP model and the computed spare capacity information for the primary backup paths. The SCA scheme further aggregates the computed SCA for the primary backup paths and the secondary backup paths for all the flows.

30 Claims, 8 Drawing Sheets

(56) References Cited

OTHER PUBLICATIONS

Dovrolis, C., "Resource Aggregation for Fault Tolerance in Integrated Services Networks," ACM Computer Communication Review, vol. 28, No. 2, 1998, pp. 39-53.
Medhi, D., "Some Approaches to Solving a Multihour Broadband Network Capacity Design Problem With Single-Path Routing," Telecommunication Systems, vol. 13, No. 2, 2000, pp. 269-291.
Kodialam, M., "Dynamic Routing of Bandwith Guaranteed Tunnels With Restoration," IEEE Infocom, 2000, 10 pages.
Clouqueur, M., "Availability Analysis of Span-Restorable Mesh Networks," IEEE Journal on Selected Areas of Communications, vol. 20, No. 4, May 2002, pp. 810-821.
Clouqueur, M., "Mesh-Restorable Networks With Complete Dual Failure Restorability and With Selectively Enhanced Dual-Failure Restorability Properties," Proceedings of Optical Networking and Communications Conference (OptiComm 2000), SPIE vol. 4874, Jul. 29-Aug. 2, 2002, pp. 1-12.
Xu, D., "Policy-Based Shared Path Protection for Dual Link Failures," Optical Networking and Communications Conference (OptiComm 2003), Proceedings of SPIE vol. 5285, 2003, 12 pages.
Doucette, J., "On the Availability and Capacity Requirements of Shared Backup Path-Protected Mesh Networks," Optical Networks Magazine, Special Issue on Engineering the Next Generation Optical Internet, vol. 4, No. 6, Nov./Dec. 2003, pp. 29-44.
Choi, H., "Loopback Recovery From Double-Link Failures in Optical Mesh Networks," IEEE/ACM Transactions on Networking, vol. 12, No. 6, Dec. 2004, pp. 1119-1130.
Liu, Y., "Approximating Optimal Spare Capacity Allocation by Successive Survivable Routing," IEEE/ACM Transactions on Networking, vol. 13, No. 1, Feb. 2005, pp. 198-211.
Prinz, R., "Dual Failure Protection in Multilayer Networks Based on Overlay or Augmented Model," in International Workshop on Design of Reliable Communication Networks (DRCN), Oct. 16-19 2005, 8 pages.
Zhang, J., "Backup Reprovisioning to Remedy the Effect of Multiple Link Failures in WDM Mesh Networks," IEEE Journal on Selected Areas of Communications, vol. 24, No. 8, Aug. 2006, pp. 57-67.
Liu, Y., "Spare Capacity Allocation in Two-Layer Networks," IEEE Journal on Selected Areas of Communications, vol. 25, No. 5, Jun. 2007, pp. 974-986.
Li, W. "p-Cycle Network Design for Specified Minimum Dual-Failure Restorability," in Proceeding of IEEE International Conference on Communications, Jun. 24-28 2007, pp. 2204-2210.
Doucette, J., "Failure Specific p-Cycle Network Dual-Failure Restorability Design," in Proceedings of 6th International Workshop on Design of Reliable Communication Networks (DRCN 2007), La Rochelle, France, Oct. 7-10, 2007, 9 pages.
Ramasubramanian, S., "Dual-Link Failure Resiliency Through Backup Link Mutual Exclusion," IEEE/ACM Transactions on Networking, vol. 16, No. 1, Feb. 2008, pp. 157-169.
Tsin, H.T., "Yet Another Optimal Algorithm for 3-Edge-Connectivity," Journal of Discrete Algorithms, vol. 7, 2009, pp. 130-146.
Ruan, L., "A Hybrid Protection/Restoration Scheme for Two-Link Failure in WDM Mesh Networks," in Proceedings of IEEE Globecom, Miami, FL, 2010, 5 pages.
Quinghua, Y., "Synergistic Protection for IP and Optical Bearer Networks," Huawei Communication, No. 58, Dec. 2010, pp. 31-34.
Liu, V., "Spare Capacity Allocation Using Shared Backup Path Protection for Dual Link Failures," 8th International Workshop on the Design of Reliable Communication Networks (DRCN), 2011, 8 pages.
Liu, V., "Spare Capacity Allocation for Dual-Link Failures," Mar. 14, 2011, 6 pages.
He, W., "Path Based Protection for Surviving Double-Link Failures in Mesh-Restorable Optical Networks," in Proceeding of IEEE GLOBECOM, 2003, pp. 2258-2563.
Liu, V., "Finding Partially Disjoint Routes for Dual Fiber-Cut Protection on Bi-Connected Networks," OFC/NFOEC Technical Digest, 2012, 3 pages.

\* cited by examiner

APPARATUS AND METHOD FOR SPARE CAPACITY ALLOCATION ON DUAL LINK FAILURES

CROSS-REFERENCE TO RELATED APPLICATIONS

The present application claims the benefit of U.S. Provisional Patent Application No. 61/468,682 filed Mar. 29, 2011 by Victor Yu Liu and entitled "Apparatus and Method for Spare Capacity Allocation on Dual Link Failures," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network via links that connect the nodes. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths. The data frames or packets may be forwarded on a plurality of links that connect multiple nodes along a path.

Different path protection schemes may be used to protect link or node failures on a path and avoid substantial data loss. Some path protection schemes handle single link failures, where a working path is assigned a backup path that is reserved in case of failures in the working path. Other more stringent schemes may be needed to handle dual link failures, where the working path is assigned a primary backup path that is reserved in case of failures in the working path, and a secondary backup path that is reserved in case of failures in the primary backup path. In some cases, at least some portions of the primary/secondary backup paths may share some network resource capacity (e.g., bandwidth) to save resources/cost in the network, which is referred to as spare capacity allocation for dual link failures. This may require a spare capacity allocation scheme for protecting against dual link failures.

SUMMARY

In one embodiment, the disclosure includes a method implemented by an apparatus for providing spare capacity allocation (SCA) for dual link failures in a network, comprising computing the SCA for each of a plurality of flows in the network for a plurality of primary backup paths corresponding to a plurality of disjoint working paths for the flows using a first integer linear programming (ILP) model, computing the SCA for each of the flows for a plurality of secondary backup paths corresponding to the disjoint working paths and the primary backup paths using a second ILP model and the computed spare capacity information for the primary backup paths, and aggregating the computed SCA for the primary backup paths and the secondary backup paths for all the flows.

In another embodiment, the disclosure includes a method implemented by an apparatus for providing SCA for dual link failures in a network, comprising computing the SCA for each of a plurality of flows in the network for a plurality of primary backup paths and a plurality of secondary backup paths corresponding to a plurality of disjoint working paths for the flows using an Integer Non-Linear Programming (INLP) model, and aggregating the computed SCA for the primary backup paths and the secondary backup paths for all the flows, wherein the INLP model is based on sharing aggregated spare capacity on every link under every scenario of dual link failures.

In another embodiment, the disclosure includes an apparatus for providing SCA for protecting against dual link failures in a network, comprising one or more network components configured to determine using a first ILP model the SCA for a plurality of primary backup paths corresponding to a plurality of disjoint working paths for a plurality of flows, determine subsequently using a second ILP model the SCA for a plurality of secondary backup paths corresponding to the working paths using the determined SCA for the primary backup paths, and aggregate the SCA for the primary backup paths and the secondary backup paths for all the flows.

In yet another embodiment, the disclosure includes a network component for provisioning SCA for dual link failures in a network, comprising a processor configured to compute using an INLP the SCA for a plurality of primary backup paths and a plurality of secondary backup paths corresponding to a plurality of working paths for a plurality of flows in the network, and aggregate the computed SCA for the primary backup paths and the secondary backup paths for all the flows, wherein the INLP model is based on sharing aggregated spare capacity on every link under every scenario of dual link failures.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
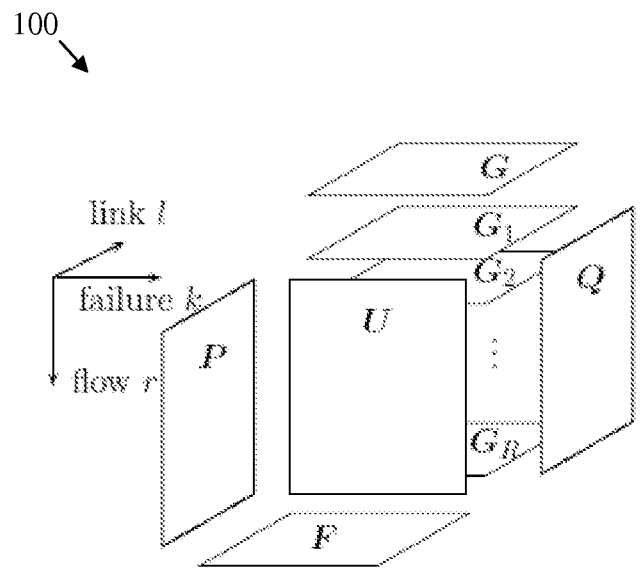
FIG. 1 is a schematic diagram of a spare capacity allocation model for single link failures.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multiple network survivability (or protection) techniques have been proposed for different network technologies. The survivability techniques may ensure network operation survival under different conditions that may affect the network, such as link/node failures. Examples of survivability techniques include multiple homing, self-healing rings, pre-planned backup routes, and p-cycles. Many of the survivability techniques correspond to single link failures, while survivability techniques for dual link failures may be less common or developed.

Disclosed herein is a system and method for enabling SCA for protecting against dual link failures. The SCA method may provide better scalability and flexibility than other survivability techniques for dual link failures. The method uses a SCA model for dual link failures in networks that use primary and secondary backup paths to protect a working path for one or more data flows. The model may be used to determine the allocation of shared spare capacity among the paths from different flows. The networks that handle dual link failures may include mesh-like Internet Protocol(IP)/Multiprotocol Label Switching (MPLS) networks, Wavelength Division Multiplexing (WDM) networks, backbone networks, and other networks that may require high level of network reliability.

The SCA model for dual link failures may minimize a pre-planned spare resource while guaranteeing substantially full service recovery (e.g., without data loss) upon a dual link failure in the network. The SCA model for dual link failures may provide end-to-end protection for a traffic flow, which may be assigned a working path and two pre-planned backup paths. The spare capacity of one or more links may be shared among multiple primary/secondary backup paths for flows that have disjoint working paths. This SCA model may compute the shared spare capacity for dual link failures with reduced redundancy (i.e., using minimum shared capacity) among the backup paths.

Other techniques for allocating spare capacity for dual link failures may not be scalable for relatively large networks. For example, one model is proposed by W. He and A. K. Somani, and entitled "Path-Based Protection for Surviving Double Link Failures in Mesh-Restorable Optical Networks," in Proceedings of the Institute of Electrical and Electronics Engineers (IEEE) GLOBECOM conference, 2003. In this model, every traffic flow has a set of pre-computed and mutually disjoint candidate paths. These paths are selected as one working and two backup paths to protect any double link failures. This proposed model captures all non-sharing conditions between any two flows so that the roles of candidate backup paths can be chosen to minimize the total capacity. However, it may be difficult to scale the solution for a relatively large network since the spare capacity sharing constraints in this model depend on complete path information of pair-wise flows. Thus, for a large number of flows, the number of the constraints may increase in a quadratic scale.

A SCA model for single link failures was also described in U.S. Pat. No. 6,744,727 filed Aug. 10, 2001 by Y. Liu, et al. and entitled "Apparatus and Method for Spare Capacity Allocation," which is incorporated herein by reference as if reproduced in its entirety. The SCA model for single link failures is also described by Y. Liu, et al. and entitled "Approximating Optimal Spare Capacity Allocation by Successive Survivable Routing," in IEEE/Association for Computing Machinery (ACM) Transactions on Networking, February 2005, which is incorporated herein by reference as if reproduced in its entirety. This model may use a Shared Backup Path Protection (SBPP) scheme for single failures, where each flow may use a disjoint backup path to protect the flow's working path upon any single link failure. Provisioning enough spare capacity using the SBPP scheme may be difficult for achieving substantially full restoration for any single link failure. The notation used in the SCA model for single link failures is summarized in Table 1 below.

TABLE 1

Notation.

| | |
|---|---|
| N, L, R, K | Numbers of nodes, links, flows, and failures |
| n, l, r, k | Indices of nodes, links, flows, and failures |
| $P = \{p_r\} = \{p_{rl}\}$ | Working path link incidence matrix |
| $Q = \{q_r\} = \{q_{rl}\}$ | Backup path link incidence matrix |
| $M = \text{Diag}(\{m_r\})$ | Diagonal matrix of bandwidth $m_r$ of flow r |
| $G = \{g_{lk}\}_{L \times K}$ | Spare provision matrix, $g_{lk}$ is spare capacity on link l for failure k |
| $G^r = \{g^r_{lk}\}_{L \times K}$ | Contribution of flow r to G |
| $s = \{s_l\}_{L \times 1}$ | Spare capacity vector |
| $\phi = \{\phi_l\}_{L \times 1}$ | Spare capacity cost function |
| W, S | Total working, spare capacity |
| $\eta = S/W$ | Network redundancy |
| o(r), d(r) | Origin/destination nodes of flow r |
| $B = \{b_{nl}\}_{N \times L}$ | Node link incidence matrix |
| $D = \{d_{rn}\}_{R \times N}$ | Flow node incidence matrix |
| $F = \{f_{kl}\}_{K \times L}$ | Failure link incidence matrix, $f_{kl} = 1$ if and only if (iff) link l fails in failure scenario k |
| $U = \{u_{rk}\}_{R \times K}$ | Flow failure incidence matrix, $u_{rk} = 1$ iff failure scenario k affects flow r's working path |
| $T = \{t_{rl}\}_{R \times L}$ | Flow tabu-link matrix, $t_{rl} = 1$ iff link l should not be used on flow r's backup path |

In the SCA model for single link failures, a network may be modeled by a directed graph of N nodes, L links, and R flows. Flow r ($1 \leq r \leq R$) may have its origin/destination node pair (o(r), d(r)) and traffic demand $m_r$. Working and backup paths of flow r may be represented by two 1×L binary row vectors $p_r = \{p_{rl}\}$ and $q_r = \{q_{rl}\}$ respectively. The l-th element in one of the vectors may be equal to one if and only if (iff) the corresponding path uses link l. The path link incidence matrices for working and backup paths may be the collections of these vectors, forming two R×L matrices $P = \{p_{rl}\}$ and $Q = \{q_{rl}\}$ respectively. The relation $M = \text{Diag}(\{m_r\}_{R \times 1})$ may denote the diagonal matrix representing demand bandwidth. The topology may be represented by the node-link incidence matrix $B = (b_{nl})_{N \times L}$ where $b_{nl} = 1$ or $-1$ iff node n is the origin or the destination node of link l. The relation $D = (d_{rn})_{R \times N}$ may be the flow node incidence matrix where $d_{rn} = 1$ or $-1$ iff o(r)=n or d(r)=n.

K failure scenarios may be characterized in a binary matrix $F = \{f_k\}_{K \times 1} = \{f_{kl}\}_{K \times L}$. The row vector $f_k$ in F may be for failure scenario k and its element $f_{kl}$ may be equal to one iff link l fails in scenario k. In this way, each failure scenario may include a set of one or more links that may fail simultaneously in the scenario. For a failed node, all the node's adjacent links may be marked as failed. A flow failure incidence matrix may be denoted as $U=\{u_r\}_{R\times 1}=\{u_{rk}\}_{R\times K}$, where $u_{rk}=1$ iff flow r is affected by failure k, and $u_{rk}=0$ otherwise. The flow tabu-link matrix $T=\{t_r\}_{R\times 1}=\{t_{rl}\}_{R\times L}$ may have $t_{rl}=1$ iff the backup path of flow r should not use link l, and $t_{rl}=0$ otherwise. U and T may be found given P and F, respectively, as shown in equations (7) and (8) below. A binary matrix multiplication operation "⊙" may be used in equations (7) and (8), which is a matrix multiply operator that is similar to normal matrix multiplication except that the general numerical addition 1+1=2 is replaced by the boolean addition 1+1=1. Using this binary operator, the logical relations among links, paths, and failure scenarios may be simplified into two matrix operations.

The matrix $G=\{g_{lk}\}_{L\times K}$ may denote a spare provision matrix whose elements $g_{lk}$ are the minimum spare capacity required on link l when failure k occurs. The relation K=L may be true when the SCA protects all single link failures. With the backup paths Q, the demand bandwidth matrix M, the working path P, and the failure matrix F, G may be determined by equations (3) and (7) below. The minimum spare capacity required on each link may be denoted by the column vector $s=\{s_l\}_{L\times 1}$, which may be found in equation (2) below. The function max in equation (2) may indicate that an element in s is equal to the maximum element in the corresponding row of G. This may be equivalent to s≥G in this model. The parameter $\phi_l$ may denote the cost function of spare capacity on link l. The vector $\phi=\{\phi_l\}_{L\times 1}$ may be a column vector of these cost functions and $\phi(s)$ may give the cost vector of the spare capacities on all links. The total cost of spare capacity in the network may correspond to $e^T\phi(s)$, where e is unit column vector of size L. For simplicity, all cost functions $\phi(s)$ may be identity functions, i.e., $\phi(s)=s$. The term $e^T$ corresponds to the transpose of the unit vector e according to the known standard transpose matrix operation. The standard transpose operation is also used in other equations below.

Using the notation and definitions above, the SCA model for single link failures may be formulated as follows:

$$\min_{Q,s} S = e^T s \quad (1)$$

$$s.t. \quad s = \max G \quad (2)$$

$$G = Q^T M U \quad (3)$$

$$T + Q \leq 1 \quad (4)$$

$$QB^T = D \quad (5)$$

$$Q: \text{binary} \quad (6)$$

$$U = P \odot F^T \quad (7)$$

$$T = U \odot F \quad (8)$$

This SCA model has the objective to minimize the total spare capacity in equation (1) with the constraints in equations (2) to (8). The decision variables are the backup path matrix Q and the spare capacity vector s. The constraints in equations (2) and (3) may associate these variables, i.e., the spare capacity allocation s may be derived from the backup paths in Q. The constraint of equation (4) may guarantee that every backup path does not use any link which may fail simultaneously with any link on its working path. A flow conservation constraint in equation (5) may guarantee that backup paths given in Q are feasible paths of flows in a directed network. The incidence matrices U and T may be pre-computed. The matrix U may indicate the failure cases that influence the working paths. The matrix T may indicate the links that are to be avoided in the backup paths. The link load, the traffic flows, and their routes may be symmetric. In a directed network, each link may have two directions with asymmetric load. In this case, the dimensions of the matrices above may be doubled, e.g., 2 L instead of L.

In another approach, the spare provision matrix G may be obtained by aggregation of per-flow based information, which may improve scalability of the solution. FIG. 1 shows a graphical representation of a SCA model 100 for single link failures that may use aggregation of per-flow information. In the SCA model 100, each flow r may have a contribution to G as $G^r=\{g^r_{lk}\}_{L\times K}$. This is shown in equation (9) below, where $u_r$ and $q_r$ are the r-th row vectors in U and Q, respectively. Thus, the spare provision matrix G may be calculated as shown in equation (10) below. This is also shown in the stack of $G^r$ in FIG. 1.

$$G^r = m_r(q_r^T u_r), \forall r, 1 \leq r \leq R \quad (9)$$

$$G = \sum_{r=1}^{R} G^r \quad (10)$$

Using the above matrices and per-flow based information in P, Q may be replaced by G as the stored network state information for spare capacity sharing. As such, the space complexity may be reduced from O(RL) to O(LK) and may be independent of the number of flows, R. This may improve the scalability of the spare capacity sharing information and make the model suitable for distributed implementation.

In the case of protecting dual link failures, each flow may have a working path and two backup paths. These three paths for the flow may be disjoint, e.g., may be established along different corresponding nodes/links. However, some of the backup paths for different flows may share capacity in the network, to reduce cost and/or preserve resources. The shared capacity may correspond to shared bandwidth, nodes, links, other resources, or combinations thereof.

Figure 2:
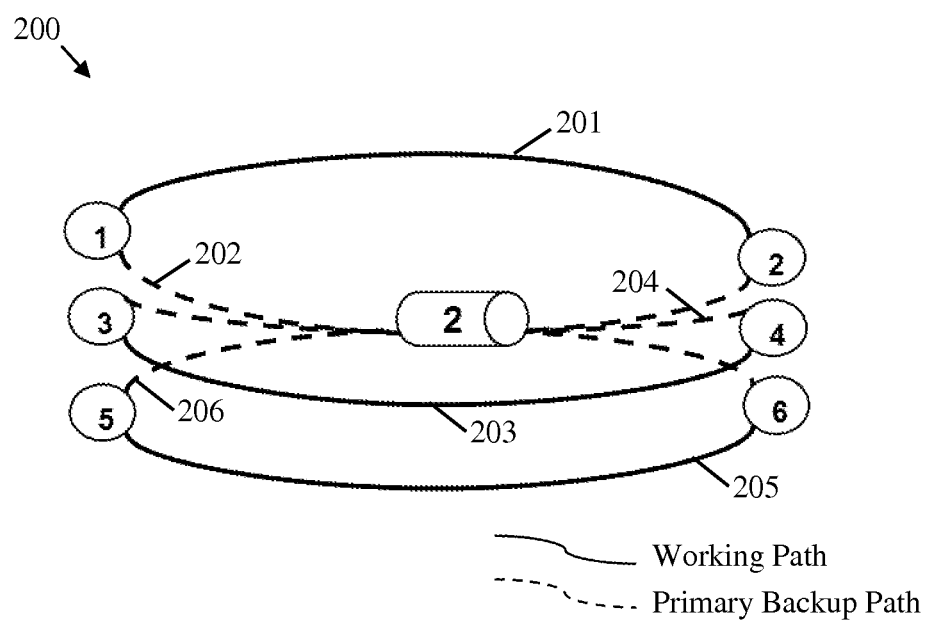
FIG. 2 is a schematic diagram of an embodiment of a dual link protection scenario.

FIG. 2 illustrates an embodiment of a dual link protection scenario 200, where each flow may be assigned a working path, a primary backup path, and a secondary backup path. The dual link protection scenario 200 may comprise three working paths 201, 203, and 205 for three corresponding data flows. The working paths 201, 203, and 205 may have corresponding primary backup paths 202, 204, and 206 and three corresponding secondary backup paths (not shown). Further, for each flow, the working paths 201, 203, and 205 may be disjoint from their corresponding primary backup paths 202, 204, and 206 (and from the corresponding secondary paths). Specifically, the working path 201 and the corresponding primary backup path 202 for a first flow between the nodes 1 and 2 may have separate links, and hence separate allocated capacity. Similarly, the working path 203 and the corresponding primary backup path 204 for a second flow between the nodes 3 and 4 may have separate links. The working path 205 and the corresponding primary backup path 206 for a third flow between the nodes 5 and 6 may also have separate links. However, the primary backup paths 202, 204, and 206 for the different flows may share some of the links, and hence may have shared allocated capacity. For instance, the three primary backup paths 202, 204, and 206 for the three flows may share 2 units of bandwidth, which may correspond to the shared spare capacity allocated to the three flows.

Figure 3:
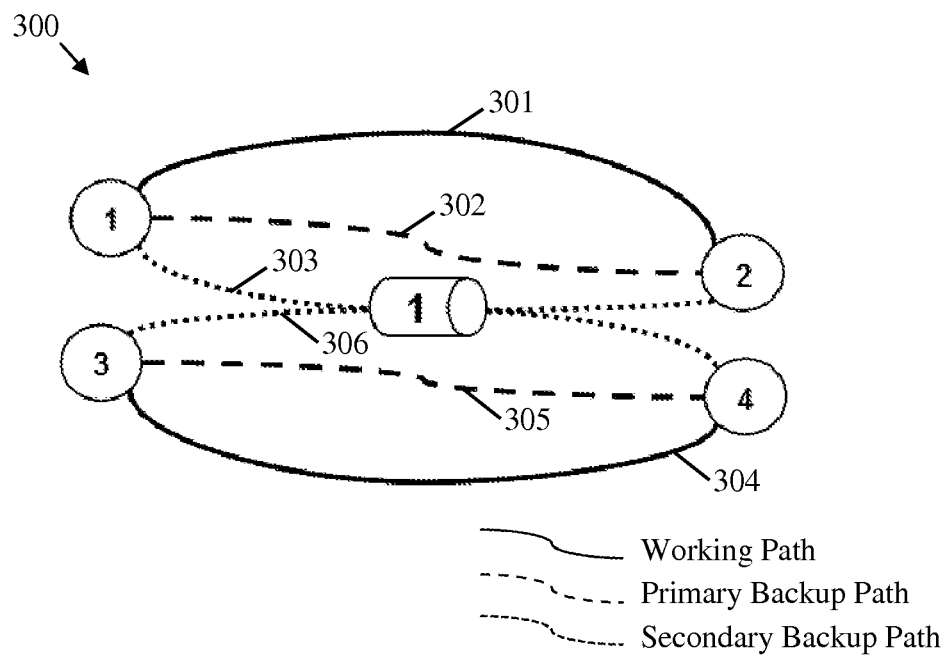
FIG. 3 is a schematic diagram of another embodiment of a dual link protection scenario.

FIG. 3 illustrates an embodiment of another dual link protection scenario 300, where each flow may be assigned a working path, a primary backup path, and a secondary backup path. The dual link protection scenario 300 may comprise two working paths 301 and 304 for two corresponding flows. The working paths 301 and 304 may have corresponding primary backup paths 302 and 305 and two corresponding secondary backup paths 303 and 306. Further, for each flow, the working paths 301 and 304 may be disjoint from their corresponding primary backup paths 302 and 305 and their corresponding secondary paths 303 and 306. Specifically, the working path 301 and the corresponding primary backup path 302 and secondary backup path 303 for a first flow between the nodes 1 and 2 may have separate links, and hence separate allocated capacity. Similarly, the working path 304 and the corresponding primary backup path 305 and secondary backup path 306 for a second flow between the nodes 3 and 4 may have separate links. However, the secondary backup paths 303 and 306 for the different flows may share some of the links, and hence may have shared allocated capacity. For instance, the two secondary backup paths 303 and 306 for the two flows may share 1 unit of bandwidth, which may correspond to the shared spare capacity allocated to the two flows.

To determine or allocate the shared spare capacity for the backup paths in the scenarios 200 and 300 with minimum allocated total spare capacity, a SCA model for dual link failures may be used. The SCA model for dual link failures may be formulated for each flow r to obtain a corresponding spare provision matrix $G^r$, which may be used as the building block for spare capacity sharing for a plurality of flows. Hence, a spare provision matrix G may be obtained by combining or aggregating the obtained spare provision matrices for a plurality of flows, e.g., in a manner similar to the aggregation in the SCA model 100. For instance, the element $g^r_{lk}$ may indicate the spare capacity required for flow r on link l when dual link failure case k happens. The total number of dual link failures may be K=

$$K = \binom{L}{2},$$

i.e., the number of possible combinations of two links in a set of L links. Each failure k∈1 . . . K may correspond to a pair of failed links i, j. The index k may be determined as k=(i−1)× L+(j−i) where 1≤i<j≤L. The failures of two links may happen at about the same time or shortly close to one another so that traffic rerouting happens only once. In a dual link failure scenario k, the working and backup paths of flow r may be impacted, and hence the spare capacity on the backup paths may need bandwidth reservation.

In one case, when a dual link failure k breaks the working path, but not the primary backup path, traffic may be protected by the primary backup path. The links on the primary backup path may require a bandwidth demand $m_r$. In the SCA model formulation, $p_{ri}=1$ iff link i is on the working path $p_r$ and $q_{rj}=1$ iff a link j is on the primary backup path $q_r$. Hence, $p_{ri}(1-q_{rj})=1$ may indicate that link i is on the working path while link j is not on the primary backup path. The parameter $u_{rk}$ may be set as $u_{rk}=p_{ri}(1-q_{rj})\oplus(1-q_{ri})p_{rj}$, where $\oplus$ is the binary plus which gives $1\oplus1=1$. Hence, $u_{rk}=1$ may indicate that failure k contains one link on the working path $p_r$ but does not contain any link on the primary backup path $q_r$. For this failure case k, the spare capacity on another link l on the primary backup path may reserve bandwidth $m_r$. This may be formulated as $g^{r[1]}_{lk}=m_r q_{rl} u_{rk}$. These equations may also be rewritten in a vector or matrix format as in equations (11) and (12).

$$G^{r[1]}=\{g_{lk}^{r[1]}\}=m_r q_r^T u_r^1 \tag{11}$$

$$u_r^1=\text{vec}(p_r^T \bar{q}_r \oplus q_r^{-T} p_r) \tag{12}$$

In the above equations, vec( ) converts a matrix with index (i, j) into a row vector with index k and $\bar{q}_r=e-q_r$ where e is a unit row vector with size L. The length of the row vector $u^1_r$ may be $L^2$ instead of the number of failures $$\binom{L}{2}.$$

This may help to maintain easier matrix formulation and conversion between k and i, j. The actual failure size may be easily controlled by removing duplicated cases during the implementation. For this reason, the SCA model formulation may use k=(i−1)L+j and K=$L^2$.

In another case, when the failure case k contains one link on the working path $p_r$ and another link on the primary backup path $q_r$, traffic may be rerouted to the secondary backup path $z_r$. Thus, the links on the secondary backup path may need spare capacity to meet bandwidth demand $m_r$ for failure case k. In this case, $u_{rk}$ may be set as $u_{rk}=p_{ri} q_{rj}\oplus q_{ri} p_{rj}$. Hence, $u_{rk}=1$ may indicate that failure case k breaks the working path $p_r$ and the primary backup path $q_r$ at the same time. Hence, the spare capacity on link l on the secondary backup path may be $m_r$. This may be formulated as $g^{r[2]}_{lk}=m_r z_{rl} u_{rk}$. These equations may be rewritten in matrix format as in equations (13) and (14).

$$G^{r[2]}=\{g_{lk}^{r[2]}\}=m_r z_r^T u_r^2 \tag{13}$$

$$u_r^2=\text{vec}(p_r^T q_r \oplus q_r^T p_r) \tag{14}$$

In the two cases above, the final per-flow based spare provision matrix is given in equation (15).

$$G^r=G^{r[1]}+G^{r[2]}. \tag{15}$$

The failure matrices F and T in equations (7) and (8) above in the single failure SCA model 100 may not be used in the SCA model for dual link failures. Instead, F may become an identical matrix for the link failure, and T may be simplified to P, as described in detail below.

Using the aggregation of the per-flow based spare provision matrix above and the additional notation in Table 2 below, the SCA model for dual link failures may be formulated as in equations (16) to (22) below.

TABLE 2

Additional notation for dual link failure.

| | |
|---|---|
| i, j | Indices of links in a dual failure k |
| $Q = \{q_r\} = \{q_{rl}\}$ | Primary backup path link incidence matrix |
| $Z = \{z_r\} = \{z_{rl}\}$ | Secondary backup path link incidence matrix |
| $G^{r[y]} = \{g^{r[y]}_{lk}\}_{L\times K}$ | Contribution of flow r's y-th backup path to G, y = 1 or 2 for primary or secondary |
| $U^y = \{u^y_{rk}\}_{R\times K}$ | The incidence matrix for flow r's y-th backup path and failures, $u^y_{rk} = 1$ iff failure scenario k causes flow r's traffic to use its y-th backup path, y = 1 or 2 |
| $S_1, S_2$ | Total spare capacity reserved for the primary or secondary backup paths |
| $\eta_1, \eta_2$ | Redundancy value for the primary or secondary backup paths, $\eta_y = S_y/W$ |
| $\delta_s, \gamma_s$ | Value and percentage of redundancy reduction from a Passive to an Active approach in scheme s, s is 1 + 1:1 or 1:1:1 (described below) |

$$\min_{Q,Z,s} S = e^T s \tag{16}$$

$$\text{s.t. } s = \max G \tag{17}$$

-continued $$G = Q^T M U^1 + Z^T M U^2 \quad (18)$$

$$P + Q + Z \le 1 \quad (19)$$

$$QB^T = D \quad (20)$$

$$ZB^T = D \quad (21)$$

$$Q, Z: \text{binary} \quad (22)$$

The objective of equation (16) may be similar to equation (1), which is to minimize the total spare capacity. In equation (16), the decision variables include not only the spare capacity s and the primary backup path matrix Q, but also the secondary backup path matrix Z. In the constraint in equation (17), the spare capacity column vector s may be derived from the maximum values of elements in rows, across all failures, in the spare provision matrix G. This may indicate that the required spare capacity on a link is equivalent to the highest "watermark" from all possible dual link failures. In the constraint in equation (18), the spare provision matrix may be derived from backup paths. This may be a matrix format, equivalent to the aggregation of per-flow based information from equations (10), (15), (11), and (13). The constraint in equation (19) may require the working and backup paths to be mutually disjoint, i.e., these paths may use the same link at most once. The constraints in equations (20) and (21) are the flow balance requirements, which may guarantee that these paths in Q and Z are valid routes between the source and destination nodes. The constraint in equation (22) may require backup path decision variables to be binary to ensure that each backup path is not bifurcated. The row vectors $u^y$ in $U^y$, $y \in 1, 2$ may be derived in equations (12) and (14) to indicate which failure case k may cause traffic detour to its primary or secondary backup path.

The SCA model above for dual link failures may be a non-linear integer programming problem. Both terms in the right side of equation (18) may involve two design variables to multiply together. In the first term $Q^T M U^1$, the design variable Q is multiplied by another variable $U^1$, which may be computed from $q_r$ in equation (12). Similarly, the second term $Z^T M U^2$ may be based on the multiplication of decision variables Z and Q via $u^2$ in equation (14). To remove the non-linearity in the first term, equation (12) may be replaced with a slightly different equation (23), where the original $\bar{q}_r$ is replaced by e (the unit row vector with size L).

$$u_r^1 = \text{vec}(p_r^T e \oplus e^T p_r) \quad (23)$$

This change may increase the spare provision matrix value on the links along the primary backup path, under the failure cases that may also disconnect this primary backup path. These values may be zero in the previous equation (12). Consequently, these values in the spare provision matrix may slightly decrease the spare capacity sharing chances with other flows.

To handle the non-linearity in the second term, the SCA model may be partitioned into two sub-models: a model to find the primary backup paths first, and another model to find the secondary backup paths next. This may simplify the solution approach but may increase the required spare capacity. In another embodiment, the SCA for each of the flows in the network for the primary backup paths and secondary backup paths may be computed using an INLP model. In the INLP model, the non-linear constraint may be resolved or removed using integer programming modeling techniques, such as by adding extra variables and constraints or breaking the non-linear constraint. This may achieve better optimal solutions. However, partitioning the SCA model for dual link failures into two models may have better computation speed.

Figure 4:
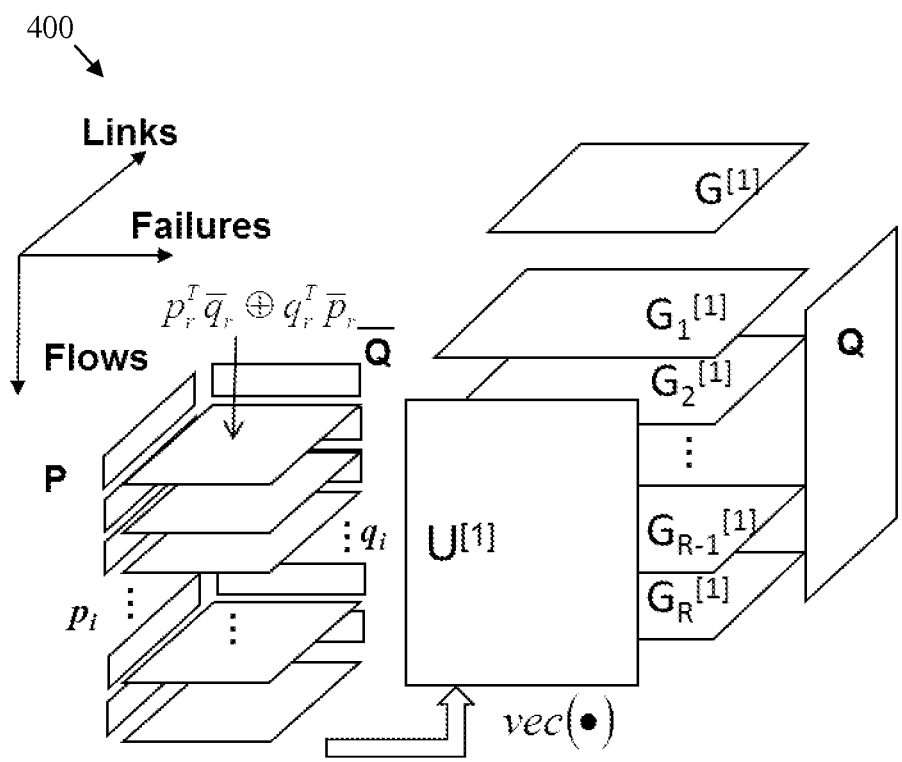
FIG. 4 is a schematic diagram of a spare capacity allocation model for dual link failures according to an embodiment of the disclosure.

FIG. 4 shows a graphical representation of a first sub-model 400 to find the primary backup paths first as part of the SCA model for dual link failures. In the first sub-model to find the primary backup paths, an ILP model may be formulated using equations (24) to (29) below to find total spare capacity for primary backup paths $S_1$.

$$\min_{Q, s_1} S_1 = e^T s_1 \quad (24)$$

$$\text{s.t.} \quad s_1 = \max G^{[1]} \quad (25)$$

$$G^{[1]} = Q^T M U^1 \quad (26)$$

$$P + Q \le 1 \quad (27)$$

$$QB^T = D \quad (28)$$

$$Q: \text{binary} \quad (29)$$

The equations above may be similar to portions of the equations (16) to (22). However, the incidence matrix $U^1$ may be obtained using equation (23).

Figure 5:
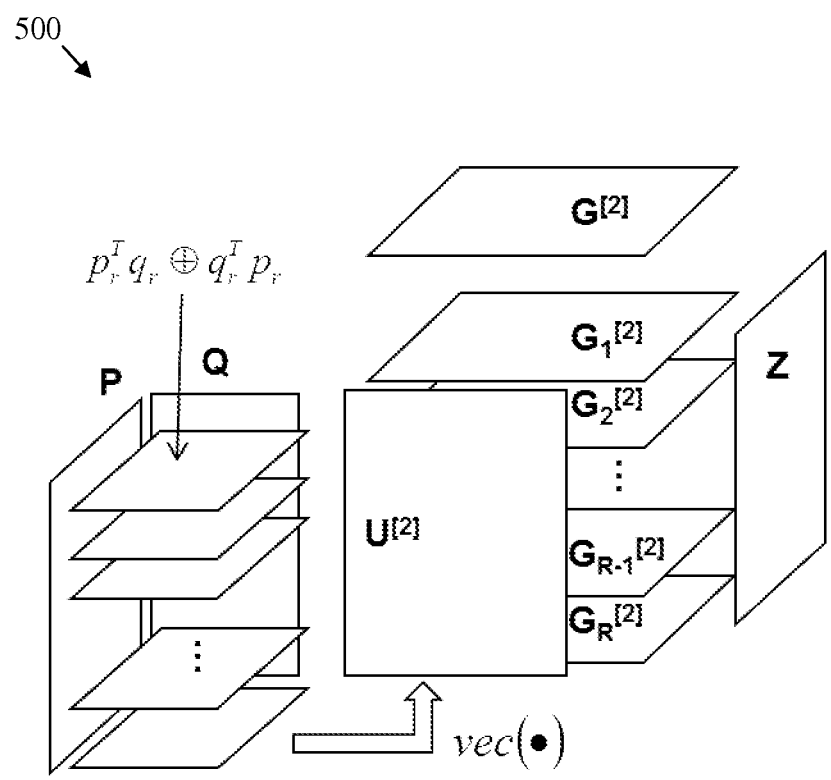
FIG. 5 is a schematic diagram of another spare capacity allocation model for dual link failures according to an embodiment of the disclosure.

FIG. 5 shows a graphical representation of a second sub-model 500 to find the secondary backup paths after finding the primary backup paths. In the second sub-model to find the secondary backup paths, the secondary backup paths may be determined (after the primary backup paths are determined in the first model) with the objective function to minimize the total spare capacity in equation (16) with the design variables Z and s. The constraints in this model may be in equations (17) to (22), (12), and (14). However, the difference here is that the primary backup paths Q and its derived matrix $U^1$ may be fixed, i.e., already calculated in the first sub-model 400. The formulation becomes an ILP model.

Both of these ILP sub-models above may be nondeterministic polynomial time (NP)-complete. The sub-models may be solved herein for relatively smaller networks using commercial software referred to as A Mathematical Programming Language (AMPL) with ILP solvers, such as CPLEX or Gurobi, which may typically use a branch and cut algorithm. To solve for larger networks, a heuristic algorithm, called successive survivable routing (SSR), may be extended to find near optimal solutions rapidly.

The backup path protection schemes may be coded on how the backup paths reserve spare capacity, such as "+1" for dedicated spare capacity and ":1" for shared spare capacity. The following backup path protection schemes are considered herein:

1+1+1 scheme stands for the dedicated path protection with no capacity sharing among backups.

1+1:1 scheme is a hybrid backup path protection with the dedicated spare capacity for primary backup paths and shared bandwidth for secondary backup paths.

1:1:1 scheme is a SBPP scheme that allows spare capacity sharing among all backup paths.

The relationship between the spare capacity sharing and the backup path routing for 1+1:1 and 1:1:1 schemes may be determined using two approaches: an Active approach and a Passive approach. The Active approach may combine the spare capacity sharing during the backup path routing. The Passive approach may find the backup paths first, and then determine the shared spare capacity. Based on these schemes and approaches, five schemes for dual link failure protection are compared in terms of the total spare capacity for primary backup paths $S_1$, and for secondary backup paths $S_2$, where $S_1$ and $S$ may be found in equations (24) and (16), and $S_2=S-S_1$. Additionally, three schemes for single link failures are also considered herein. The schemes are:

1) A dedicated 1+1+1 scheme is the dedicated path protection scheme. This scheme may use the shortest path algorithm to find mutually disjoint primary and secondary backup paths. The spare capacity on these backup paths may be reserved separately. There is no spare capacity sharing. This scheme may use the largest total spare capacity.
2) A Passive 1+1:1 scheme may also use the shortest path algorithm to find mutually disjoint primary and secondary backup paths. After all backup paths are found, the spare capacity among secondary backup paths may then be shared based on the spare provision matrix method in equations (30) and (31).

$$s_2 = \max G^{[2]} \quad (30)$$

$$G^{[2]} = Z^T M U^2 \quad (31)$$

3) An Active 1+1:1 scheme may use the shortest path algorithm to find mutually disjoint primary backup paths. After that, the ILP model in the second sub-model described above may be used to find the secondary backup paths.
4) A Passive 1:1:1 scheme may use the shortest path algorithm to find mutually disjoint primary and secondary backup paths. After these paths are found, their spare capacity for all backup paths may then be shared using the spare provision matrix method in equations (17) and (18).
5) An Active 1:1:1 scheme may consider spare capacity sharing during the process of finding both backup paths. The ILP models may be used sequentially in the first sub-model and the second sub-model to find these backup paths which may also produce the minimum total spare capacity in these ILP sub-models.
6) A dedicated 1+1 scheme is the dedicated path protection scheme for single link failure. This scheme may use the shortest path algorithm to find mutually disjoint backup paths and the spare capacity on these backup paths may be reserved and dedicated to the corresponding flow. In this scheme, there may be no sharing of spare capacity.
7) A Passive 1:1 scheme may use the shortest path algorithm to find a backup path disjoint from its working path. The spare capacity for all backup paths may then be shared using the spare provision matrix method in equation (2) and (3).
8) An Active 1:1 scheme may consider spare capacity sharing during the process of finding both backup paths. The ILP model in the SCA model for single link failures may be used to find these backup paths which may also produce the minimum total spare capacity.

Figure 6:
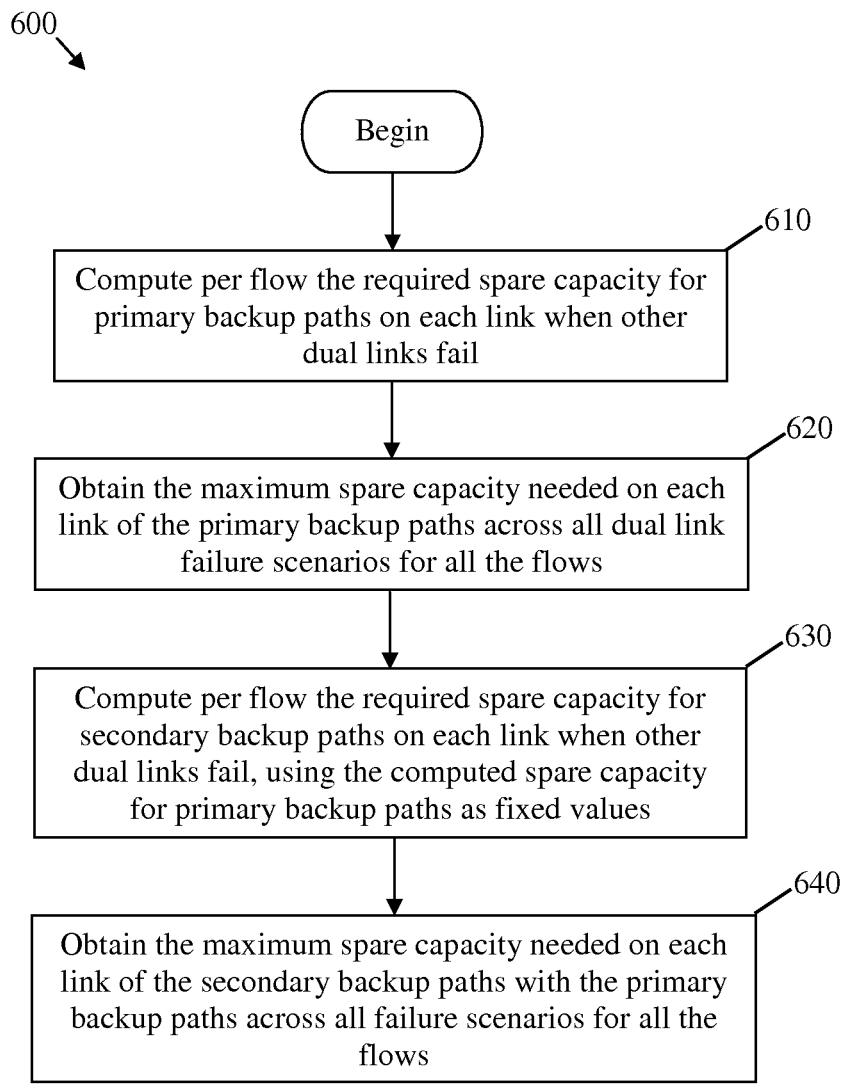
FIG. 6 is a flowchart of a spare capacity allocation method for dual link failures according to an embodiment of the disclosure.

FIG. 6 illustrates an embodiment of a SCA method 600 for dual link failures. The SCA method 600 may be based on the SCA model above for dual link failures and may be used to obtain minimum shared spare capacity allocation (e.g., in term of bandwidth units) for a plurality of primary and secondary backup paths for corresponding working paths that carry multiple data flows. At block 610, the method 600 may compute per flow the required spare capacity for primary backup paths on each link when other dual links fail. The required spare capacity for primary backup paths may be computed using information about the assigned links and failed links for each working path and information about the assigned links for each primary backup path. Accordingly, a spare provision matrix for primary backup paths may be computed using equations (26) to (29). At block 620, the method 600 may obtain the maximum spare capacity needed on each link of the primary backup paths across all dual link failure scenarios for all the flows. Accordingly, a spare capacity vector for the primary backup paths may be computed using equation (25). A corresponding total spare capacity reserved for the primary backup paths may also be obtained using equation (24). Blocks 610 and 620 may correspond to the first sub-model 400 that allocates spare capacity for the primary backup paths first (without the secondary backup paths) as part of the SCA model for dual link failures.

At block 630, the method 600 may compute per flow the required spare capacity for secondary backup paths on each link when other links fail, using the computed spare capacity for primary backup paths as fixed values. The required spare capacity for secondary backup paths may be computed using information about the assigned links and failed links for each working path, information about the assigned links for each secondary backup path, and the computed spare capacity for primary backup paths. Accordingly, a spare provision matrix for secondary backup paths given a spare provision matrix for primary backup paths may be computed using equations (18) to (22). At block 640, the method 600 may obtain the maximum spare capacity needed on each link of the secondary backup paths with the primary backup paths across all failure scenarios for all the flows. Accordingly, a spare capacity vector for the secondary backup paths with the primary backup paths may be computed using equation (17). A corresponding total spare capacity reserved for the secondary backup paths with the primary backup paths may also be obtained using equation (16). Blocks 630 and 640 may correspond to the second sub-model 400 that allocates spare capacity for the secondary backup paths after allocating spare capacity for the primary backup paths as part of the SCA model for dual link failures. The method 600 may allocate minimum shared spare capacity for the primary and secondary backup paths per flow.

Figure 7:
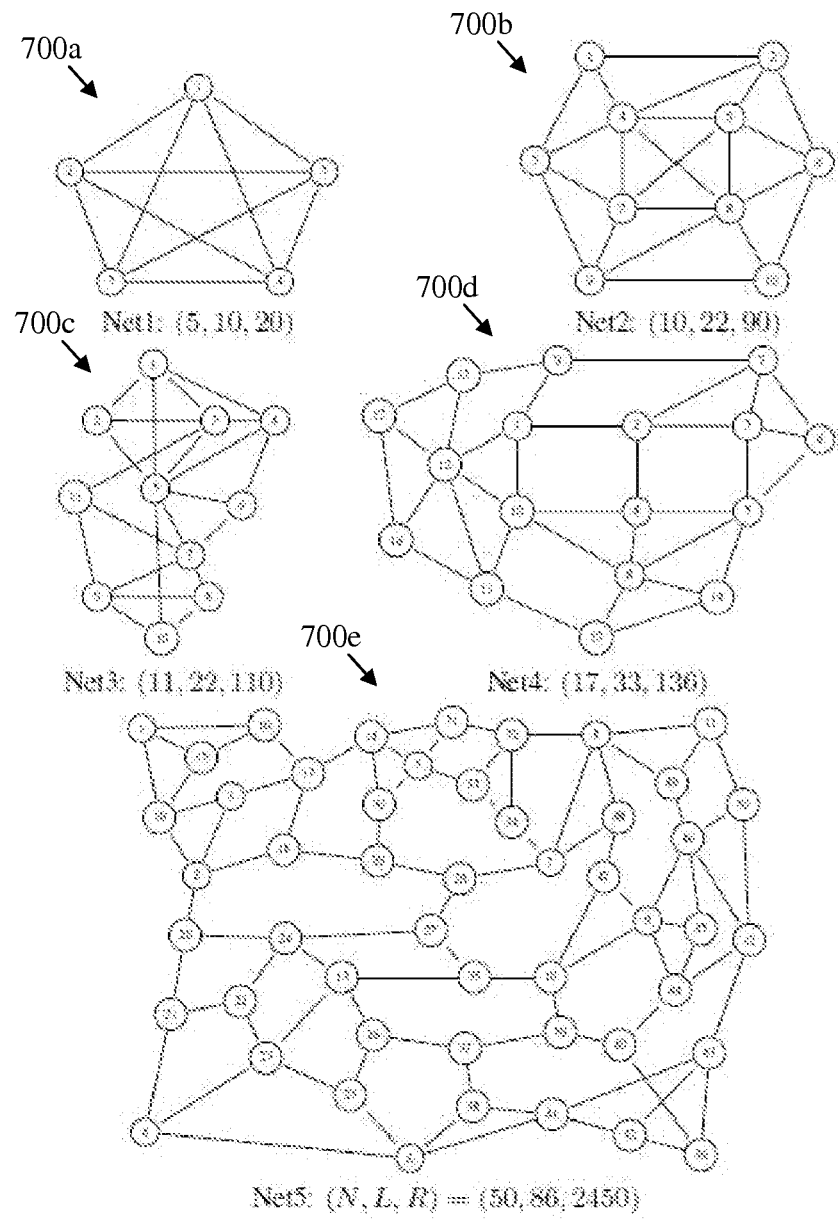
FIG. 7 is a schematic diagram of a plurality of simulated network topologies.

FIG. 7 illustrates a plurality of network topologies 700a to 700e which have been considered in numerical experiments (simulations). The numerical experiments were performed for the network topologies 700a to 700e to examine the SCA model for dual link failures. Each of the network topologies 700a to 700e comprises a plurality of nodes interconnected by a plurality of links, where multiple flows were considered. Each of the network topologies 700a to 700e comprises a different combination of numbers of nodes, links, and flows that are indicated by the triplet (N, L, R). Specifically, the network topology 700a (Net1) comprises 5 nodes, 10 links, and 20 flows (indicated by (5, 10, 20)). The network topology 700b (Net2) comprises 10 nodes, 22 links, and 90 flows. The network topology 700c (Net3) comprises 11 nodes, 22 links, and 110 flows. The network topology 700d (Net4) comprises 17 nodes, 33 links and 136 flows. The network topology 700e (Net5) comprises 50 nodes, 86 links, and 2450 flows.

The results of the numerical experiments are given in Table 3 below. The network node count in the network topologies 700a to 700e ranges from 5 to 50 with an average node degree from 3.4 to 4.4, as shown in the first five rows of Table 3. Each network topology has full-meshed flows with one unit bandwidth demand per flow. The working paths were pre-determined using the shortest path algorithm. The total working capacity W is listed in the sixth row of Table 3. More details about the numerical studies and results are described by Y. Liu, et al. and entitled "Spare Capacity Allocation Using Shared Backup Path Protection for Dual Link Failures," in IEEE 8th International Workshop on the Design of Reliable Communication Networks (DRCN), 2011, which is incorporated herein by reference as if reproduced in its entirety.

TABLE 3

Numerical results for the five network topologies.

| Network | | 1 | 2 | 3 | 4 | 5 |
|---|---|---|---|---|---|---|
| Num. of nodes N | | 5 | 10 | 11 | 17 | 50 |
| Num. of links L | | 10 | 22 | 22 | 33 | 86 |
| Avg. node deg. d | | 4 | 4.4 | 4 | 3.9 | 3.44 |
| Num. of flows R | | 20 | 90 | 110 | 272 | 2450 |
| Total working cap. W | | 20 | 142 | 190 | 626 | 10888 |
| Dedicated | $S_1$ | 40 | 198 | 282 | 846 | 15136 |
| 1 + 1 + 1 | $S_2$ | 40 | 246 | 376 | 1216 | 22208 |
| | S | 80 | 444 | 658 | 2062 | 37344 |
| | $\eta_1$ | 200% | 139% | 148% | 135% | 139% |
| | $\eta_2$ | 200% | 173% | 198% | 194% | 204% |
| | $\eta$ | 400% | 313% | 346% | 329% | 343% |
| Passive | $S_1$ | 40 | 198 | 282 | 846 | 15136 |
| 1 + 1:1 | $S_2$ | 22 | 110 | 192 | 494 | 8938 |
| | S | 62 | 308 | 474 | 1340 | 24074 |
| | $\eta_1$ | 200% | 139% | 148% | 135% | 139% |
| | $\eta_2$ | 110% | 77% | 101% | 79% | 82% |
| | $\eta$ | 310% | 217% | 249% | 214% | 221% |
| Active | $S_1$ | 40 | 198 | 282 | 846 | 15136 |
| 1 + 1:1 | $S_2$ | 14 | 74 | 142 | 322 | — |
| | S | 54 | 272 | 424 | 1168 | —‡ |
| | $\eta_1$ | 200% | 139% | 148% | 135% | 139% |
| | $\eta_2$ | 70% | 52% | 75% | 51% | — |
| | $\eta$ | 270% | 192% | 223% | 187% | — |
| | $\delta_{1+1:1}$ | 40% | 25% | 26% | 27% | — |
| | $\gamma_{1+1:1}$ | 13% | 12% | 11% | 13% | — |
| Passive | $S_1$ | 24 | 152 | 216 | 588 | 10450 |
| 1:1:1 | $S_2$ | 12 | 44 | 128 | 220 | 6494 |
| | S | 36 | 196 | 344 | 808 | 16944 |
| | $\eta_1$ | 120% | 107% | 114% | 94% | 96% |
| | $\eta_2$ | 60% | 31% | 67% | 35% | 60% |
| | $\eta$ | 180% | 138% | 181% | 129% | 156% |
| Active | $S_1$ | 20 | 92 | 168 | 390 † | —‡ |
| 1:1:1 | Time(s) | 6.2 | 598 | 19 | 20 hr† | — |
| | $S_2$ | 16 | 56 | 96 | 214 | — |
| | S | 36 | 148 | 264 | 604 | — |
| | Time(s) | 0.27 | 1.2 | 0.42 | 3.0 | — |
| | $\eta_1$ | 100% | 65% | 88% | 62% | — |
| | $\eta_2$ | 80% | 39% | 51% | 34% | — |
| | $\eta$ | 180% | 104% | 139% | 96% | — |
| | $\delta_{1:1:1}$ | 0% | 34% | 43% | 32% | — |
| | $\gamma_{1:1:1}$ | 0% | 24% | 24% | 25% | — |
| Passive | $S_1$ | 14 | 94 | 142 | 380 | 6738 |
| 1:1 | $\eta_1$ | 70% | 66% | 75% | 61% | 62% |
| Active | $S_1$ | 10 | 50 | 94 | 208 | 4544 |
| 1:1 | Time(s) | 2 | 11 | 11 | 713 | 16.6 hr |
| | $\eta_1$ | 50% | 35% | 49% | 33% | 42% |
| | $\delta_{1:1}$ | 20% | 31% | 25% | 27% | 20% |
| | $\gamma_{1:1}$ | 40% | 88% | 51% | 83% | 48% |

The rows in Table 3 list the numerical results for the different path protection schemes. The total spare capacity is shown for primary, secondary, and both backup paths, i.e., $S_1$, $S_2$, S respectively. Their respective redundancy value $\eta_1$, $\eta_2$, $\eta$ are also listed, where $$\eta = \frac{s}{w}.$$

For the "Active 1:1:1" scheme, the time (in seconds) to compute $S_1$ and S using AMPL with CPLEX or Gurobi solvers are also provided. For the rest of the results, the computation time was less than seconds and hence ignored. In the bottom of Table 3, the results from the two 1:1 schemes are listed to compare the required redundancy for single versus dual link failures.

Figure 8:
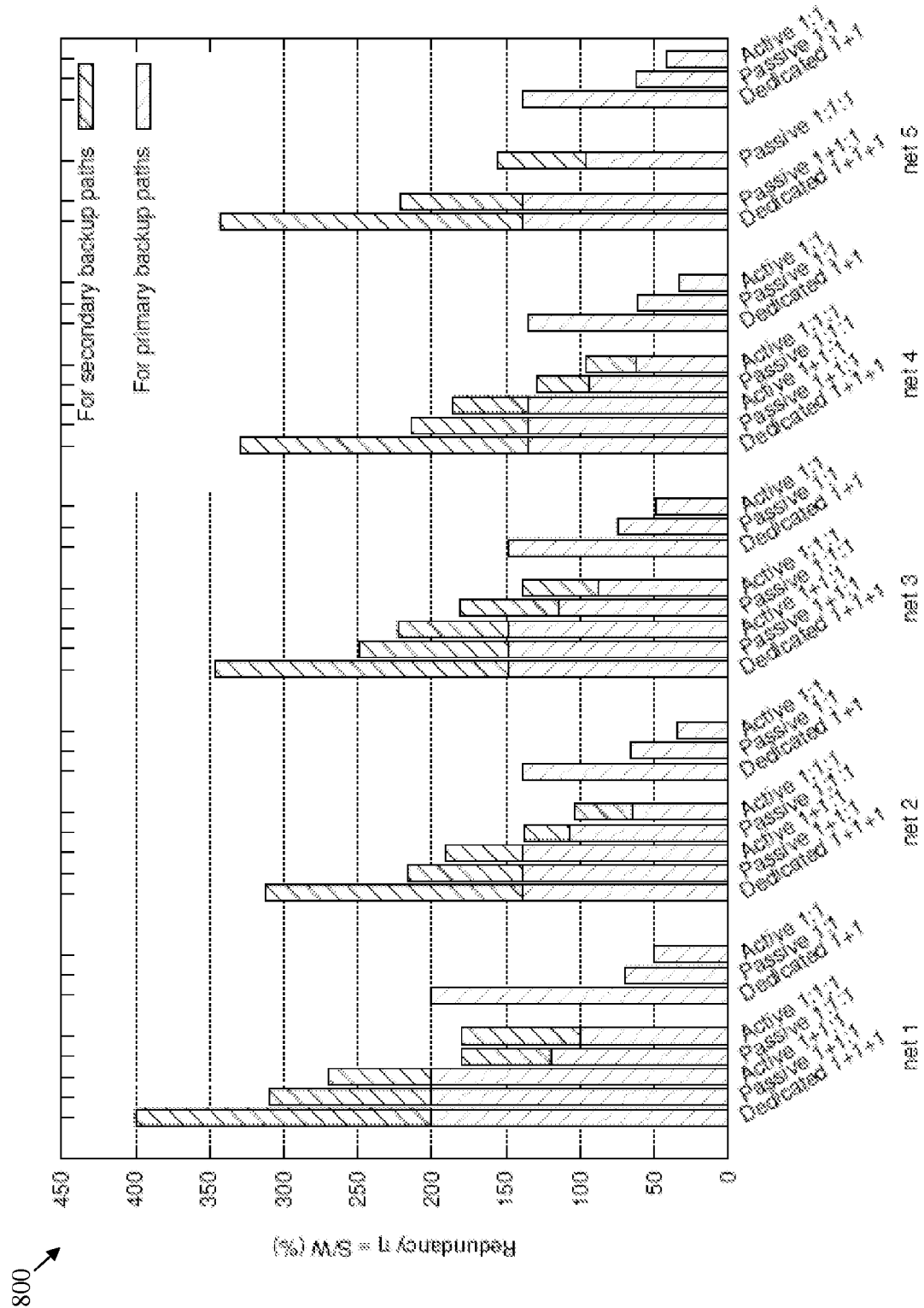
FIG. 8 is a chart of a plurality of numerical results for the simulated network topologies of FIG. 7.

FIG. 8 shows a chart 800 illustrating some of the numerical results in Table 3. The redundancy values $\eta_1$ and $\eta_2$ in Table 3 are shown as bars in the chart 800. For each of the schemes, these values are tracked together so that the total redundancy $\eta$ can be seen by the top of the bar. From these numerical results, several observations may be made.

The results show that the redundancy may be reduced by increasing the complexity. It was found that the 1+1+1 dedicated protection scheme has the highest redundancy range of 313 to 400%. This is reduced down to 96 to 181% in the 1:1:1 SBPP scheme without loss of dual link resiliency. This tradeoff between redundancy and complexity is important to evaluate various protection schemes. The hybrid 1+1:1 scheme may provide intermediate redundancy ratio at 187 to 310%, while its complexity is also moderate between the other two schemes.

The results also show that the Active approach may have lower redundancy than the Passive approach. The results show that the Active approach may have lower redundancy compared to the corresponding Passive approach in both 1+1:1 and 1:1:1 schemes. Further, there is a reduction in the value $\delta_s$ and the ratio $\gamma_s$ for the network redundancy from the Passive to Active approach in the same schemes for s. These parameters may be computed using equations (32).

$$\delta_s = \eta_s^{Passive} - \eta_s^{Active}$$

$$\gamma_s = \delta_s / \eta_s^{Passive}, s \in \{1+1:1, 1:1:1, 1:1\} \qquad (32)$$

The results in Table 3 also show that $\gamma_{1+1:1}$ is about 12% across four of the network topologies considered, while $\gamma_{1:1:1}$ is about 25% for the three non-trivial networks 2 to 4.

The results also show that the secondary backup paths may use less spare capacity than the primary backup paths in SBPP. In both 1+1:1 and 1:1:1 schemes, the secondary backup paths may use less spare capacity than that of the primary backup paths. The ratio of $$\frac{s_1}{s_2}$$

varies from 0.8 in the result of the Active 1:1:1 scheme on network 1 down to 0.29 in the result of the Passive 1:1:1 scheme on network 2. On the contrary in the dedicated 1+1+1 scheme, the secondary backup paths use about the same or more spare capacity than the primary backup paths with the same ratio varying from 1 to 1.47.

The results also show that it may require substantially more redundancy to protect 100% dual link failures than single link failures. When the network redundancy for the first four networks are compared, the Active 1:1:1 scheme has about 1.8 to 2.6 times of redundancy value compared to that of the Active 1:1 scheme. This considerable increase on the redundancy may be critical for the network service providers to make the decision between these protection mechanisms and their extra resource requirements (cost).

Figure 9:
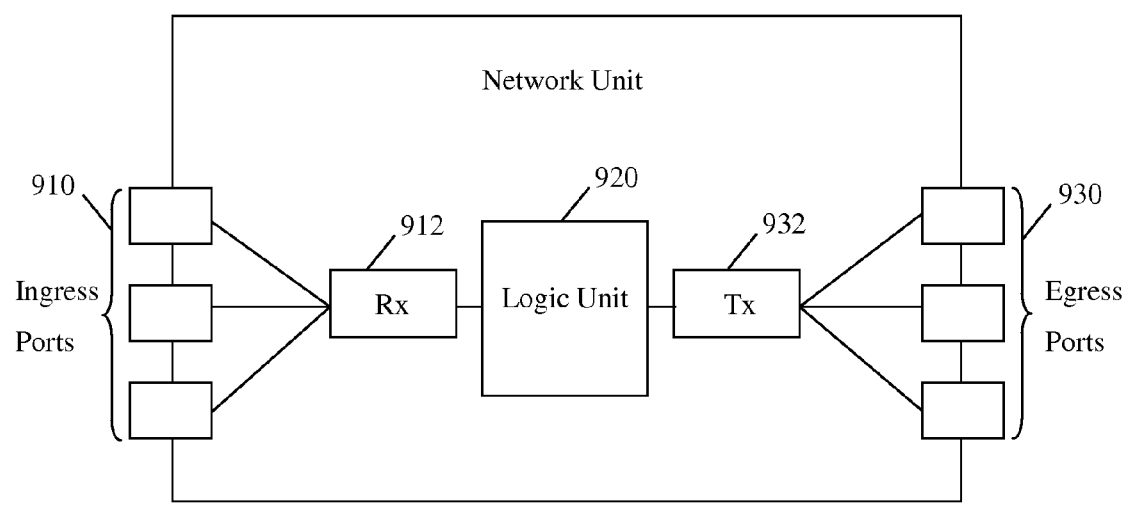
FIG. 9 is a schematic diagram of an embodiment of a network unit.

FIG. 9 illustrates an embodiment of a network unit 900, which may be any device that transports and processes data in a network, such as a node in an IP/MPLS network, WDM network, backbone network, or any other network that may have relatively high level of network reliability. Specifically, the network may use a primary backup path and a secondary backup path for each working path that services one or more data flows, and also use the SCA model described above for protecting against dual link failures. The SCA model may be implemented by a single network unit in the network or in a distributed manner by a plurality of network units 900 or similar nodes. The network unit 900 may comprise one or more ingress ports or units 910 coupled to a receiver (Rx) 912 for receiving signals and frames/data from other network components. The network unit 900 may comprise a logic unit 920 to determine which network components to send the packets to. The logic unit 920 may be implemented using hardware, software, or both. The network unit 900 may also comprise one or more egress ports or units 930 coupled to a transmitter (Tx) 932 for transmitting signals and frames/data to the other network components. The receiver 912, logic unit 920, and transmitter 932 may also implement or support any of the SCA schemes and methods described above. The components of the network unit 900 may be arranged as shown in FIG. 9.

Figure 10:
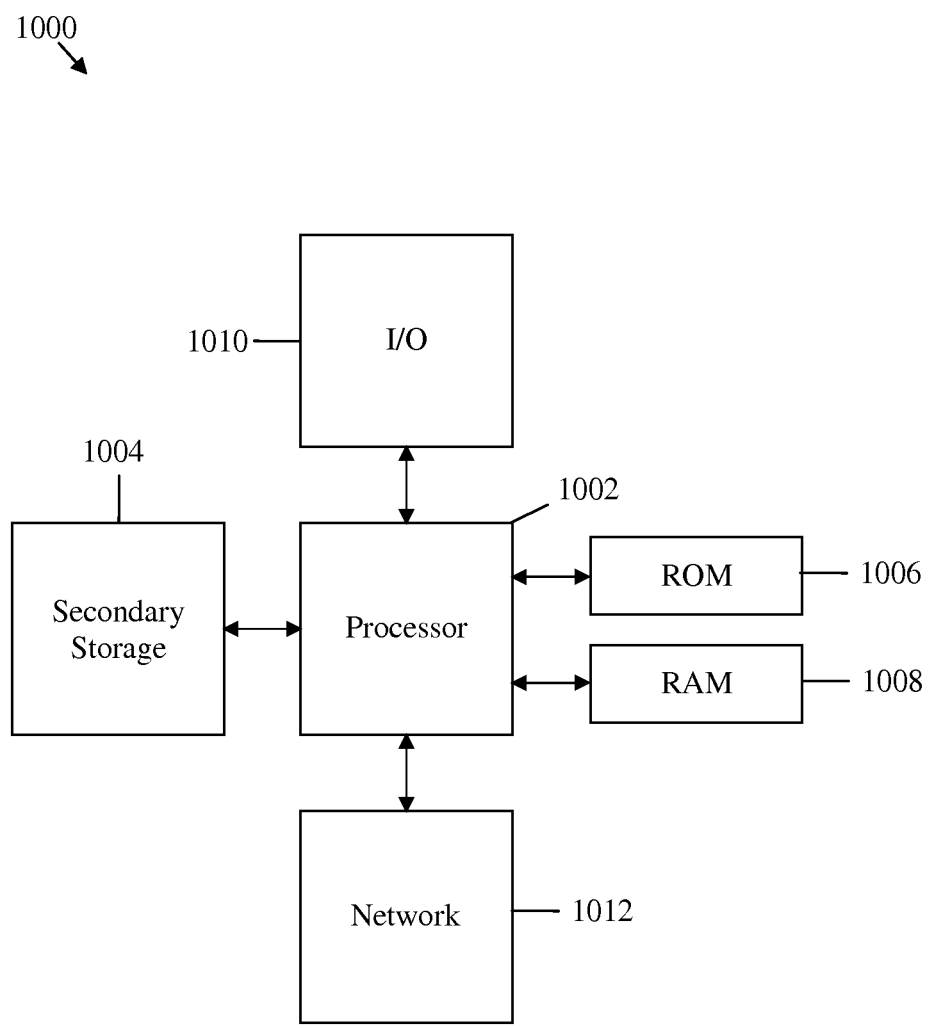
FIG. 10 is a schematic diagram of an embodiment of a general-purpose processing system.

In some embodiments, the models, schemes, and methods described above may be implemented on any general-purpose network component, such as a computer or network component with sufficient processing power, memory resources, and network throughput capability to handle the necessary workload placed upon it. FIG. 10 illustrates a typical, general-purpose processing component 1000 suitable for implementing one or more embodiments of the models and schemes disclosed herein. For instance, the general-purpose processing component 1000 may be a network component, such as a node, a server (of the network), or any computer system. The processing component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by an apparatus for providing spare capacity allocation (SCA) for dual link failures in a network, comprising:
    computing the SCA for each of a plurality of flows in the network for a plurality of primary backup paths corresponding to a plurality of disjoint working paths for the flows using a first integer linear programming (ILP) model;
    computing the SCA for each of the flows for a plurality of secondary backup paths corresponding to the disjoint working paths and the primary backup paths using a second ILP model and the computed SCA for the primary backup paths; and
    aggregating the computed SCA for the primary backup paths and the secondary backup paths for all the flows.

2. The method of claim 1, wherein the first ILP model and the second ILP model are both based on sharing aggregated spare capacity on every link under every scenario of dual link failures.

3. The method of claim 1, wherein the first ILP model to compute the SCA for the primary backup paths is based on the following mathematical matrix operations:

$$\min_{Q,s_1} S_1 = e^T s_1$$

$$\text{s.t. } s_1 = \max G^{[1]}$$

$$G^{[1]} = Q^T M U^1$$

$$P + Q \le 1$$

$$QB^T = D$$

$$Q: \text{binary}$$

where $S_1$ is a vector of spare capacity reserved for the primary backup paths, e is a unit row vector, $G^{[1]}$ is a spare provisioning matrix for the first backup paths, Q is a primary backup path link incidence matrix, M is a diagonal matrix of bandwidth, $U^1$ is a flow failure incidence matrix for the primary backup paths, P is a working path link incidence matrix, B is a node link incidence matrix, and D is a flow node incidence matrix.

4. The method of claim 3, wherein $G^{[1]}$ and $U^1$ are computed per flow as $G'^{[1]}$ and $u^1_r$ respectively to improve scalability and computation speed based on the following mathematical matrix operations:

$$G'^{[1]} = \{g_{lk}'^{[1]}\} = m_r q_r^T u_r^1$$

$$u_r^1 = \text{vec}(p_r^T \bar{q}_r \oplus \bar{q}_r^T p_r)$$

where $g'^{[1]}_{lk}$ is the element of $G'^{[1]}$ for link l and failure scenario k, $m_r$ is a row vector of bandwidths for flow r, $q_r$ is a row vector of primary backup path links for flow r, $\bar{q}_r = e - q_r$, and $p_r$ is a row vector of working path links for flow r, and wherein $G^{[1]}$ is computed as the sum of $G'^{[1]}$ for all the flows.

5. The method of claim 3, wherein to remove non-linearity in $U^1$, $U^1$ is computed per flow based on the following mathematical matrix operations:

$$u_r^1 = \text{vec}(p_r^T e \oplus e^T p_r)$$

where $\bar{q}_r$ is replaced by the unit row vector e.

6. The method of claim 3, wherein the second ILP model to compute the SCA for the secondary backup paths is based on the following mathematical matrix operations:

$$\min_{Q,Z,s} S = e^T s$$

$$\text{s.t. } s = \max G$$

$$G = Q^T M U^1 + Z^T M U^2$$

$$P + Q + Z \le 1$$

$$QB^T = D$$

$$ZB^T = D$$

$$Q, Z: \text{binary}$$

where S is a vector of total spare capacity reserved for the secondary backup paths with the primary backup paths, e is a unit row vector, G is a spare provisioning matrix for the secondary backup paths with the first backup paths, $U^2$ is a flow failure incidence matrix for the secondary backup paths, and Z is a secondary backup path link incidence matrix, and Q, M, and $U^1$, P, B, and D are obtained from the first ILP model.

7. The method of claim 6, wherein G is computed from the sum of $G^{[1]}$ obtained from the first ILP model and $Z^T M U^2$ that corresponds to a second spare provisioning matrix $G^{[2]}$, wherein $G^{[2]}$ and $U^2$ are computed per flow as $G'^{[2]}$ and $u^2_r$ respectively to improve scalability and computation speed based on the following mathematical matrix operations:

$$G'^{[2]} = \{g_{lk}'^{[2]}\} = m_r z_r^T u_r^2$$

$$u_r^2 = \text{vec}(p_r^T q_r \oplus q_r^T p_r)$$

where $g'^{[2]}_{lk}$ is the element of $G'^{[2]}$ for link l and failure scenario k, $z_r$ is a row vector of secondary backup path links for flow r and $m_r$, $q_r$, and $p_r$ are obtained from the first ILP model, and wherein $G^{[2]}$ is computed as the sum of $G'^{[2]}$ for all the flows.

8. The method of claim 1, wherein the primary backup paths and the secondary backup paths do not share spare capacity.

9. The method of claim 1, wherein the primary backup paths do not share spare capacity and the secondary backup paths share spare capacity.

10. The method of claim 1, wherein the primary backup paths and the secondary backup paths share spare capacity.

11. The method of claim 1, wherein sharing spare capacity between more backup paths reduces the ratio of spare capacity over working capacity for the flows.

12. The method of claim 1, wherein spare capacity is shared between at least some of the primary backup paths and secondary backup paths in an active approach during routing the primary backup paths and secondary backup paths in the network.

13. The method of claim 1, wherein spare capacity is shared between at least some of the primary backup paths and secondary backup paths in a passive approach after routing the primary backup paths and secondary backup paths in the network.

14. A method implemented by an apparatus for providing spare capacity allocation (SCA) for dual link failures in a network, comprising:
computing the SCA for each of a plurality of flows in the network for a plurality of primary backup paths and a plurality of secondary backup paths corresponding to a plurality of disjoint working paths for the flows using an integer non-linear programming (INLP) model; and
aggregating the computed SCA for the primary backup paths and the secondary backup paths for all the flows,
wherein the INLP model is based on sharing aggregated spare capacity on every link under every scenario of dual link failures.

15. The method of claim 14, wherein the INLP model to compute the SCA for the primary backup paths and the secondary backup paths is based on the following mathematical matrix operations:

$$\min_{Q,Z,s} S = e^T s$$

$$\text{s.t. } s = \max G$$

$$G = Q^T M U^1 + Z^T M U^2$$

$$P + Q + Z \le 1$$

$$QB^T = D$$

$$ZB^T = D$$

$$Q, Z: \text{binary}$$

where S is a vector of total spare capacity reserved for the primary and secondary backup paths, e is a unit row vector, G is a spare provisioning matrix for the primary and secondary backup paths, $U^1$ is a flow failure incidence matrix for the primary backup paths, $U^2$ is a flow failure incidence matrix for the secondary backup paths, Q is a primary backup path link incidence matrix, Z is a secondary backup path link incidence matrix, M is a diagonal matrix of bandwidth, P is a working path link incidence matrix, B is a node link incidence matrix, and D is a flow node incidence matrix.

16. An apparatus for providing spare capacity allocation (SCA) for protecting against dual link failures in a network, comprising:
one or more network components configured to:
determine using a first integer linear programming (ILP) model the SCA for a plurality of primary backup paths corresponding to a plurality of disjoint working paths for a plurality of flows,
determine subsequently using a second ILP model the SCA for a plurality of secondary backup paths corresponding to the working paths using the determined SCA for the primary backup paths, and
aggregate the SCA for the primary backup paths and the secondary backup paths for all the flows.

17. The apparatus of claim 16, wherein at least some of the primary backup paths and secondary backup paths are joint paths that share one or more links.

18. The apparatus of claim 16, wherein the first ILP model and the second ILP model are used to reduce the SCA for the primary backup paths and the secondary backup paths and provide substantially full survivability for the flows.

19. The apparatus of claim 16, wherein the SCA for the primary backup paths and the SCA for the secondary backup paths are determined per flow, and wherein the determined SCA for the primary backup paths and the secondary backup paths are subsequently aggregated for all the flows.

20. The apparatus of claim 19, wherein determining the SCA per flow before aggregating the SCA for all the flows improves scalability of SCA to handle larger networks with more paths and flows.

21. The apparatus of claim 16, wherein the working paths are initially assigned to the flows, and wherein the primary backup paths and the secondary backup paths are subsequently determined to reduce or optimize overall resource allocation for the working paths, the primary backup paths, and the secondary backup paths.

22. The apparatus of claim 16, wherein one or more of the working paths for the flows are changed, and wherein the primary backup paths and the secondary backup paths are subsequently determined to reduce or optimize overall resource allocation for the working paths, the primary backup paths, and the secondary backup paths.

23. The apparatus of claim 16, wherein the first ILP model to compute the SCA for the primary backup paths is based on the following mathematical matrix operations:

$$\min_{Q, s_1} S_1 = e^T s_1$$

$$\text{s.t. } s_1 = \max G^{[1]}$$

$$G^{[1]} = Q^T M U^1$$

$$P + Q \leq 1$$

$$QB^T = D$$

$$Q: \text{binary}$$

where $S_1$ is a vector of spare capacity reserved for the primary backup paths, e is a unit row vector, $G^{[1]}$ is a spare provisioning matrix for the first backup paths, Q is a primary backup path link incidence matrix, M is a diagonal matrix of bandwidth, $U^1$ is a flow failure incidence matrix for the primary backup paths, P is a working path link incidence matrix, B is a node link incidence matrix, and D is a flow node incidence matrix.

24. The apparatus of claim 23, wherein $G^{[1]}$ and $U^1$ are computed per flow as $G'^{[1]}$ and $u^1_r$ respectively to improve scalability and computation speed based on the following mathematical matrix operations:

$$G'^{[1]} = \{g_{lk}'^{[1]}\} = m_r q_r^T u_r^1$$

$$u_r^1 = \text{vec}(p_r^T \bar{q}_r \oplus \bar{q}_r^T p_r)$$

where $g'^{[1]}_{lk}$ is the element of $G'^{[1]}$ for link l and failure scenario k, $m_r$ is a row vector of bandwidths for flow r, $q_r$ is a row vector of primary backup path links for flow r, $\bar{q}_r = e - q_r$, and $p_r$ is a row vector of working path links for flow r, and wherein $G^{[1]}$ is computed as the sum of $G'^{[1]}$ for all the flows.

25. The apparatus of claim 23, wherein the second ILP model to compute the SCA for the secondary backup paths is based on the following mathematical matrix operations:

$$\min_{Q, Z, s} S = e^T s$$

$$\text{s.t. } s = \max G$$

$$G = Q^T M U^1 + Z^T M U^2$$

$$P + Q + Z \leq 1$$

$$QB^T = D$$

$$ZB^T = D$$

$$Q, Z: \text{binary}$$

where S is a vector of total spare capacity reserved for the secondary backup paths with the primary backup paths, e is a unit row vector, G is a spare provisioning matrix for the secondary backup paths with the first backup paths, $U^2$ is a flow failure incidence matrix for the secondary backup paths, and Z is a secondary backup path link incidence matrix, and Q, M, and $U^1$, P, B, and D are obtained from the first ILP model.

26. The apparatus of claim 25, wherein G is computed from the sum of $G^{[1]}$ obtained from the first ILP model and $Z^T M U^2$ that corresponds to a second spare provisioning matrix $G^{[2]}$, wherein $G^{[2]}$ and $U^2$ are computed per flow as $G'^{[2]}$ and $u^2_r$ respectively to improve scalability and computation speed based on the following mathematical matrix operations:

$$G'^{[2]} = \{g_{lk}'^{[2]}\} m_r z_r^T u_r^2$$

$$u_r^2 = \text{vec}(p_r^T q_r \oplus q_r^T p_r)$$

where $g'^{[2]}_{lk}$ is the element of $G'^{[2]}$ for link l and failure scenario k, $z_r$ is a row vector of secondary backup path links for flow r and $m_r$, $q_r$, and $p_r$ are obtained from the first ILP model, and wherein $G^{[2]}$ is computed as the sum of $G'^{[2]}$ for all the flows.

27. The apparatus of claim 16, wherein the first ILP model comprises computing per flow spare capacity required on each of a plurality of links for the primary backup paths when other dual links fail, and subsequently obtaining maximum spare capacity needed on each of the links across all failure scenarios for all the flows, and wherein the spare capacity is computed based on a plurality of links assigned for the working paths, any failed links from the links for the working paths, a plurality of links assigned for the primary backup paths, and bandwidth allocated on the links for the primary backup paths and the working paths.

28. The apparatus of claim 27, wherein the second ILP model comprises computing per flow spare capacity required on each of a plurality of links for the secondary backup paths when other dual links fail using the computed spare capacity required for the primary backup paths in the first ILP model as fixed values, and subsequently obtaining maximum spare capacity needed on each of the links across all failure scenarios for all the flows, and wherein the required spare capacity for the secondary backup paths is computed based on a plurality of links assigned for the working paths, any failed links from the links for the working paths, a plurality of links assigned for the secondary backup paths, and bandwidth allocated on the links for the secondary backup paths and the working paths.

29. A network component for provisioning spare capacity allocation (SCA) for dual link failures in a network, comprising a processor configured to:
compute using an integer non-linear programming (INLP) the SCA for a plurality of primary backup paths and a plurality of secondary backup paths corresponding to a plurality of working paths for a plurality of flows in the network; and
aggregate the computed SCA for the primary backup paths and the secondary backup paths for all the flows,
wherein the INLP model is based on sharing aggregated spare capacity on every link under every scenario of dual link failures.

30. The network component of claim 29, wherein the INLP model to compute the SCA for the primary backup paths and the secondary backup paths is based on the following mathematical matrix operations:

$$\min_{Q,Z,s} S = e^T s$$
$$\text{s.t.} \quad s = \max G$$
$$G = Q^T M U^1 + Z^T M U^2$$
$$P + Q + Z \le 1$$
$$Q B^T = D$$
$$Z B^T = D$$
$$Q, Z: \text{binary}$$

where S is a vector of total spare capacity reserved for the primary and secondary backup paths, e is a unit row vector, G is a spare provisioning matrix for the primary and secondary backup paths, $U^1$ is a flow failure incidence matrix for the primary backup paths, $U^2$ is a flow failure incidence matrix for the secondary backup paths, Q is a primary backup path link incidence matrix, Z is a secondary backup path link incidence matrix, M is a diagonal matrix of bandwidth, P is a working path link incidence matrix, B is a node link incidence matrix, and D is a flow node incidence matrix.

* * * * *

UNITED STATES PATENT AND TRADEMARK OFFICE
CERTIFICATE OF CORRECTION

| | | |
|---|---|---|
| PATENT NO. | : 9,001,648 B2 | |
| APPLICATION NO. | : 13/434632 | |
| DATED | : April 7, 2015 | |
| INVENTOR(S) | : Victor Yu Liu | |

It is certified that error appears in the above-identified patent and that said Letters Patent is hereby corrected as shown below:

In the Claims:

Column 20, Lines 45-59, Claim 26, should read as:

26. The apparatus of claim 25, wherein G is computed from the sum of $G^{[1]}$ obtained from the first ILP model and $Z^T MU^2$ that corresponds to a second spare provisioning matrix $G^{[2]}$, wherein $G^{[2]}$ and $U^2$ are computed per flow as $G^{r[2]}$ and $u^2_r$ respectively to improve scalability and computation speed based on the following mathematical matrix operations:

$$G^{r[2]} = \{g^{r[2]}_{lk}\} = m_r z_r^T u_r^2$$
$$u_r^2 = vec(p_r^T q_r \otimes q_r^T p_r)$$

where $g^{r[2]}_{lk}$ is the element of $G^{r[2]}$ for link l and failure scenario k, $z_r$ is a row vector of secondary backup path links for flow r and $m_r$, $q_r$, and $p_r$ are obtained from the first ILP model, and wherein $G^{[2]}$ is computed as the sum of $G^{r[2]}$ for all the flows.

Signed and Sealed this
Twenty-seventh Day of October, 2015

Michelle K. Lee
*Director of the United States Patent and Trademark Office*